United States Patent

Lockwood et al.

[15] 3,639,004
[45] Feb. 1, 1972

[54] TUNNELING MACHINES

[72] Inventors: Peter Lockwood; Gerald R. O. Pentith, both of Darlington, England

[73] Assignee: Greenside Machine Company Limited, Darlington, England

[22] Filed: Jan. 2, 1970

[21] Appl. No.: 308

[52] U.S. Cl. .................................. 299/10, 299/59, 299/86
[51] Int. Cl. ....................................... E21c 27/24, E01g 3/04
[58] Field of Search .................... 299/10, 18, 57, 59, 61, 86, 299/80; 175/57, 106

[56] References Cited

UNITED STATES PATENTS

| | | | |
|---|---|---|---|
| 1,467,513 | 9/1923 | Starr et al. | 299/61 X |
| 3,306,663 | 2/1967 | Webster | 299/61 X |
| 3,477,762 | 11/1969 | Frenyo et al. | 299/86 X |

FOREIGN PATENTS OR APPLICATIONS

| | | | |
|---|---|---|---|
| 118,437 | 0/1958 | U.S.S.R. | 299/59 |

Primary Examiner—Ernest R. Purser
Attorney—Chittick, Pfund, Birch, Samuels & Gauthier

[57] ABSTRACT

A tunneling machine has a radially extending arm mounted at its center to a rotatably torque shaft. Each half of the arm mounts a respective rotary cutting head which is traversable over that half. In use, the cutting heads are equally spaced from the torque shaft axis, and the torque shaft is rotated through 180° to remove mineral from a face. The arm is then returned to its original position, equally spaced radial positions and a further cutting movement performed. Other cutting procedures may be employed.

3 Claims, 9 Drawing Figures

PATENTED FEB 1 1972

INVENTORS
Peter Lockwood
Gerald R. O. Pentith
BY
Chittick, Pfund, Birch, Samuels & Gauthier

ATTORNEYS

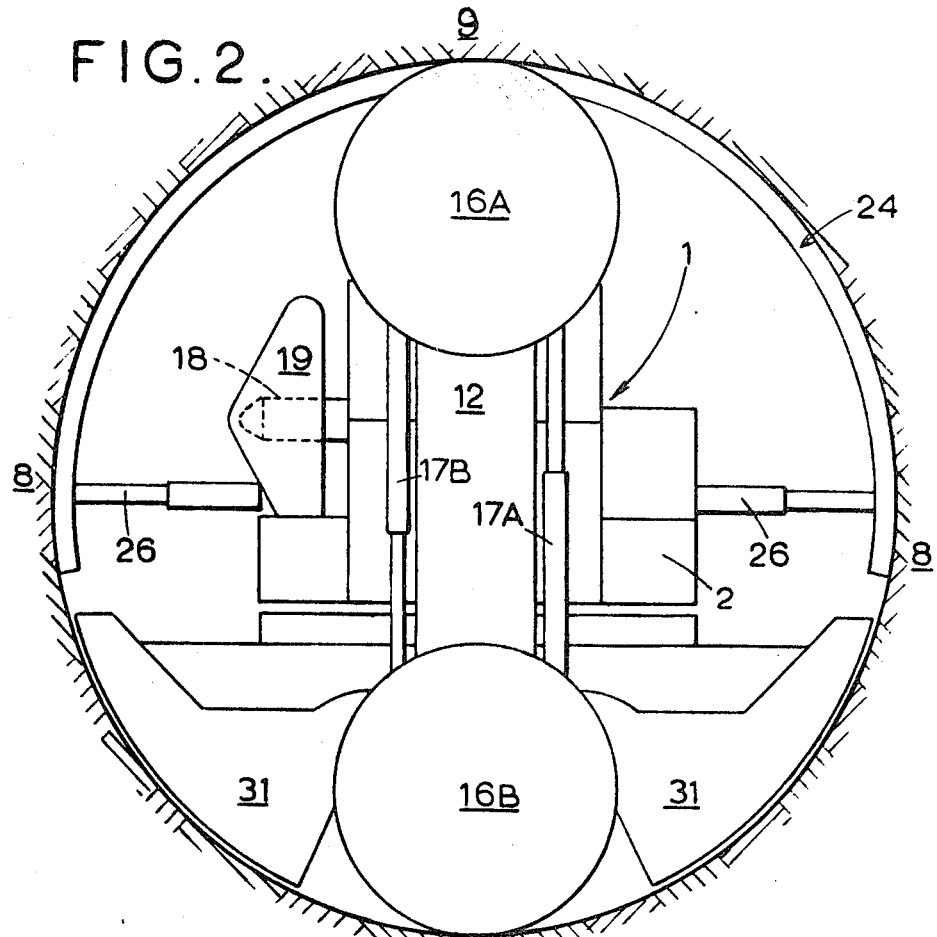
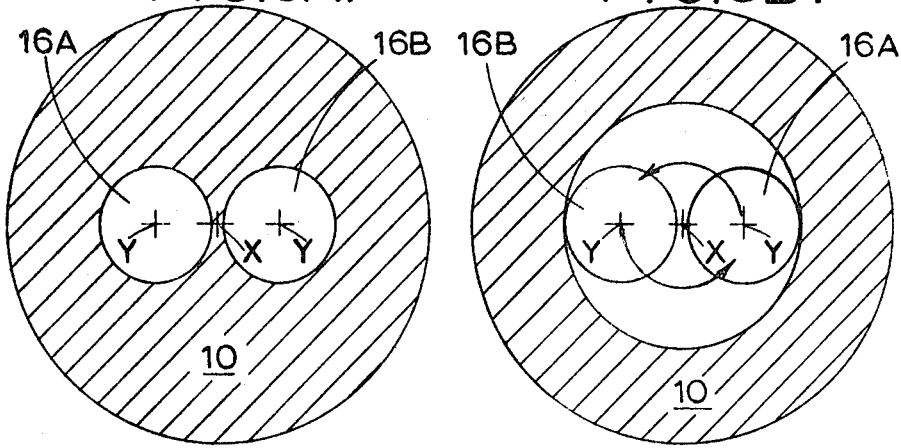

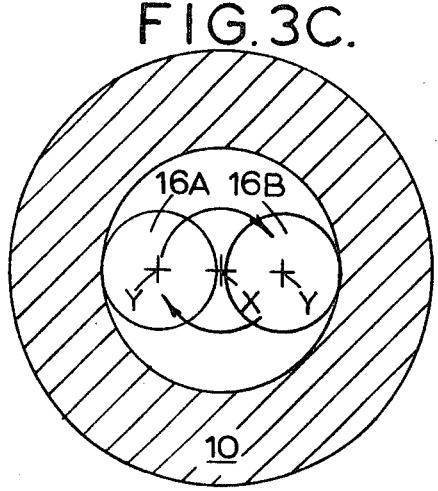
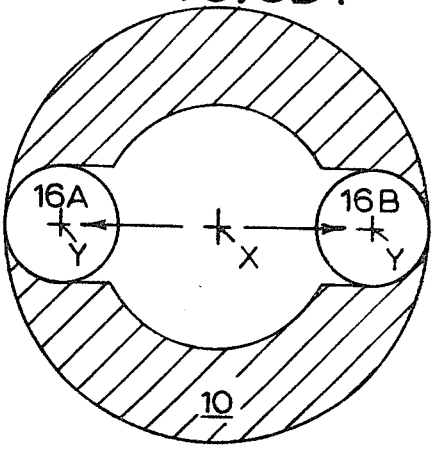
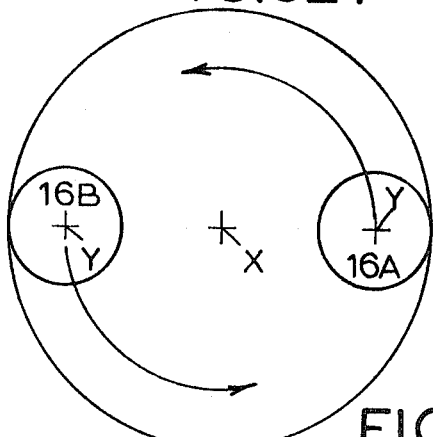
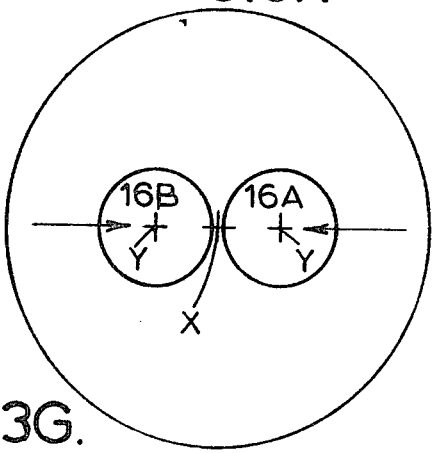
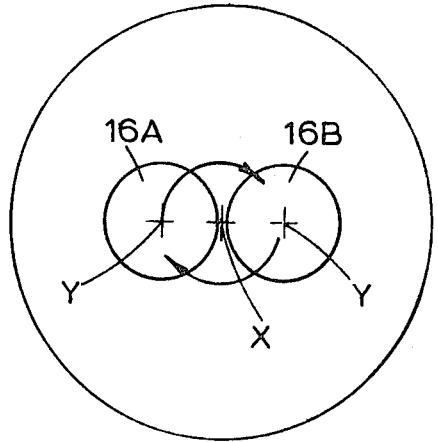

3,639,004

TUNNELING MACHINES

BACKGROUND OF INVENTION

This invention relates to a method of tunneling, and to a machine for carrying out the invention.

A machine and method of tunneling is known in which a rotary cutting head is moved about an axis so as to remove mineral from the face. In order for a circular-sectioned tunnel to be cut out, the cutting head is required with the known machine to perform a relatively complex series of movements, which reduces the rate at which the tunnel can be driven.

SUMMARY OF INVENTION

In accordance with the method provided by this invention, two rotary cutting heads are mineral face and are moved about an axis parallel to and lying between the heads so as to remove mineral from the face, after moving through an angle of substantially 180°, the cutting heads are traversed radially to new positions and their axes are again moved about the axis to remove mineral.

Preferably, after each mineral-removing movement about the said axis, each cutting head is returned through an angle of substantially 180°, before a further mineral-removing movement is performed.

A machine for carrying out the method of the invention comprises a frame mounting a forwardly extending torque shaft which carries a radial arm having two half portions extending in opposite directions, a respective rotary cutting head is mounted on each half portion and is traversable along it.

In the case of a preferred embodiment of tunneling machine, the frame is presented to the rock to be tunneled and the axis of rotation of the arm is coincident with the axis of the desired tunnel section. The arm is advanced by extending a frame mounted hydraulic ram which brings the cutting heads into operative contact with the rock face at whatever the position occupied by each head along its half of the arm and in whatever the angular position occupied by the arm in relation to the front of the machine. Continued advancement of the arm causes the cutting heads to penetrate the rock in an axial direction. Each cutting head can occupy any radial position, up to that corresponding to the outermost limit of movement along its half of the arm. With the cutting heads secured in any such radial position, rotation of the arm about its axis by rotation of the torque shaft causes the cutting head axes to perform arcuate movements so that the heads remove rock in arcuate paths, the radial dimension of which equals the overall cutting diameter of the head. Assuming that the heads are at their outermost limits on the arm, the outside of the arcuate path cut defines the diameter of the tunnel to be cut, and inside the cut path remains uncut rock centrally of the tunnel section, which can be removed by repositioning the cutting heads appropriately nearer to the axis of rotation of the arm and then rotating the arm. Depending upon the diameters of the cutting heads in relation to the desired tunnel diameter, the heads may be repositioned along the arm as many times as are necessary to enable them to remove rock over the entire section by successive rotations of the arm. The above-mentioned procedure can be reversed; the cutting heads may first attack the center of the section, and then deal progressively with rock nearer to the periphery of the section. It is also possible for the cutting heads to make a radial cut, with the arm held stationary, and for rock removal to be performed by any combination of arcuate cuts and radial cuts.

Advantageously, the entire arm, or each half thereof, is constituted as a radial slideway and each rotary cutting head may be mounted on a carriage that is traversable on the slideway.

Preferably, hydraulic means such as rams or motors are employed for rotating the cutting heads, the torque shaft, and for advancing the frame. Thus, each cutting head may be rotatable by a hydraulic motor and gearbox interposed between each cutting head and its carriage. Also the torque shaft may be rotated either through 180° by a link mechanism or through 360° by a ring gear secured to the arm driven by a pinion secured to the frame.

Preferably, the machine includes means for adjusting the location of the axis of rotation of the arm with respect to the horizontal, so that the direction of forward advance of cutting can be adjusted in the vertical sense. Thus, the frame may be transversely pivoted on the support means, with means provided to rock the frame for adjustment of the axis of rotation of the arm, either in line with the frame or canted upwardly and downwardly as necessary for vertical "steering."

For horizontal advancing and "steering" of the machine, double support means may be provided, a lower support platform to rest on the floor of the tunneled section, and an upper support means mounted on a turntable arrangement above the lower support means. The lower support platform includes the self-advancing and retracting mechanism for the whole machine e.g., hydraulically actuated jacks, rams and skid-plates.

For location and securing of the machine in the tunneled section, the frame (or upper support means for the frame) may be provided with an overhead articulated roof support system with means for urging the elements of the system to the roof of the section. The elements may be curved plates to form a protective canopy over a substantial part of the machine. When the machine is to be advanced, the system is first released, to be urged again to the roof when the advance has been completed.

The machine preferably includes a conveyor for the removal of rock to the rear substantially continuously with the detachment of the rock by the cutting head. To enable the conveyor to receive rock from close to the face under attack, and yet to permit operation of the cutting head down to floor level, the conveyor is preferably mounted so that it can be advanced and retracted with respect to the main machine. Thus, the conveyor may be mounted on the lower support means indicated above, and pass centrally under the machine between the skid-plates. A scraper chain conveyor with an elevated rear end permits ready transfer of rock to a main conveyor, advanced in the rear of the machine in the section already tunneled.

For gathering of rock from the width of the tunnel section to a centrally disposed conveyor, curved sideplates, curved sections of scraper chain construction or hinged flaps may be disposed at each side of the front of the conveyor. To assist the advance of the conveyor and to enable it to be self-loading as regards rock lying on the floor as the conveyor is pushed over the floor towards the face under attack, an oblique pusher plate may be mounted across the front of the conveyor. The curved sideplates, conveyors or hinged flaps may be similarly fitted with oblique pusher plates.

DESCRIPTION OF THE DRAWINGS

FIG. 2 is a view in the direction of arrow A of FIG. 1;
and
FIGS. 3A to 3G illustrate a suitable cutting sequence.

DESCRIPTION OF PREFERRED EMBODIMENT

Figure 1:
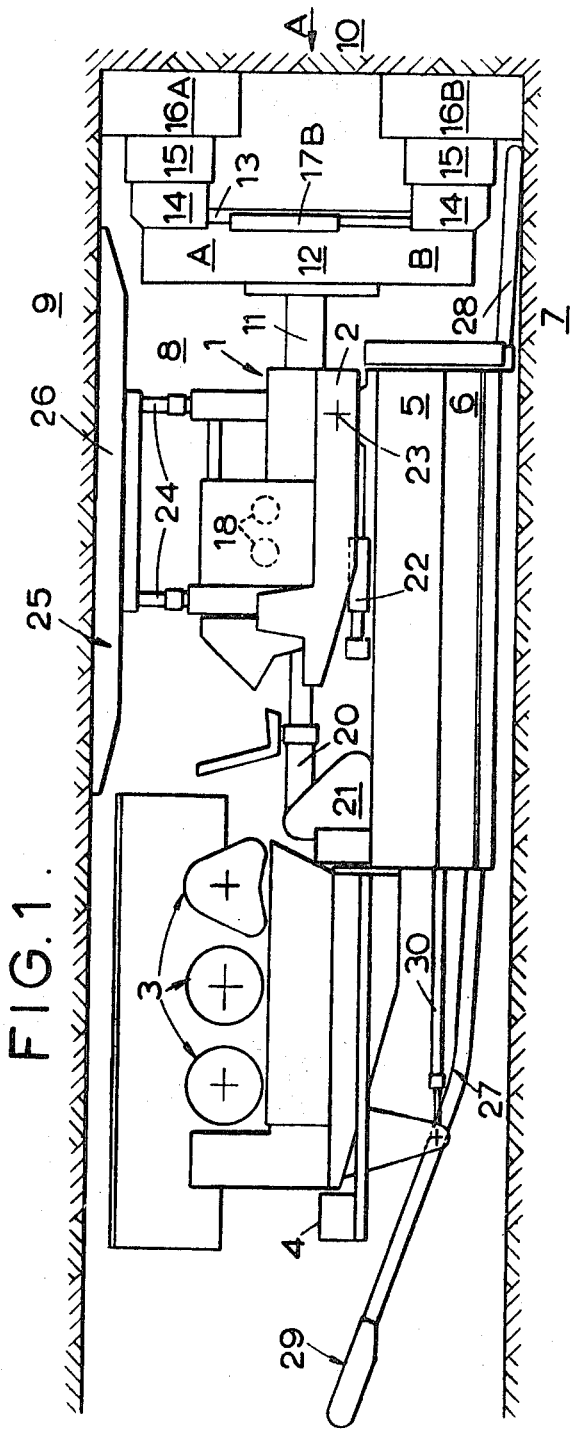
FIG. 1 is a side elevation of a tunneling machine according to the invention.

In the drawings, the machine is indicated generally at 1. The machine has a frame 2 which mounts a power unit 3 controlled from an operator's platform 4. The frame is seated on spaced-apart longitudinally extending parallel supports 5 which rest on support means in the form of a support platform 6. The platform 6 rests in turn on the tunnel floor 7, the walls of the tunnel being indicated at 8, the roof at 9 and the face to be removed at 10. A torque shaft 11 protrudes forwardly from the frame 2 and carries an arm 12, halves A and B of which extend radially in opposite directions. The arm is provided with slideway 13 on which is slidably mounted two carriers 14. Each of the carriers supports a hydraulic motor and gearbox unit 15, which serves to drive about respective axes Y a pair of cutting heads 16A and 16B provided with picks (not shown). The carriers 14 are movable along the slideway by means of piston and cylinder units 17A and 17B. Preferably, the carriers 14 are continuously maintained at equal distances from the torque shaft axis X by the jointly controlled piston and cylinder units. This arrangement provides excellent counterbalancing of cutting heads 16A and 16A about the torque shaft axis of rotation.

The torque shaft 11 is rotatable through 180° about axis X by two hydraulic piston and cylinder units 18 which are pivoted to brackets 19 which serve to rotate a link mechanism.

The torque shaft 11, and hence the cutting heads 16A and 16B, is movable axially by a hydraulic ram 20 secured to the frame by a bracket 21.

The machine is self-propelled by providing the support platform 6 with floats, jacks, skid and support plates, and associated piston and cylinder units to effect a walking movement, forwards and backwards.

To provide for steering of the machine in a left or right direction, the frame 2 is mounted on a turntable arrangement on the beams 5 and located between the latter, and is rotated about a turntable by rams 22 located one on each side of the frame.

To provide for steering of the machine in an up or down direction, the frame 2 may be pivoted at 23.

Also a pair of piston and cylinder units 24 extending upwardly from the frame 2 urge a roof support system 25 against the roof 9, with lateral piston and cylinder units 26 urging the system against the walls 8.

To remove material dislodged by the cutting heads 16A and 16B an advanceable and retractable conveyor 27 with a forward end 28 and an elevated rear discharge end 29 is located centrally of the support platform 6. The conveyor is advanced and retracted by means of piston and cylinder units 30 disposed substantially horizontally on each side of the conveyor. At each side of the forward end of the support platform 6 is a hinged loader flap 31 which serves to sweep material on to the conveyor 27.

With reference to FIGS. 3A to 3G, a cutting sequence commences with the arm 12 horizontal i.e., rotated through 90° from the position shown in FIGS. 1 and 2, and with the rams 17A and 17B retracted so that the cutting heads 16A and 16B are in their innermost positions on their halves A and B respectively, of the arm 12.

With the cutting heads 16A and 16B in this position and rotating, the ram 20 is extended to urge the cutting heads 16A and 16B forwardly, thus sumping them into the face 10 to be removed as is shown in FIG. 3A.

FIG. 3B shows the cutting heads 16A and 16B after the torque shaft 11 has been rotated to move the axes Y of the cutting heads through 180° in an anticlockwise direction about axis X. This movement is achieved by extension of rams 18.

FIG. 3C shows the cutting heads after they have been returned through 180° in a noncutting manner by retraction of the rams 18.

The rams 17A and 17B are then extended to traverse the cutting heads 16A and 16B along their respective arms A and B equal distances from axis X as shown in FIG. 3D.

FIG. 3E shows the cutting heads 16A and 16B after the torque shaft 11 has been rotated through 180° in an anticlockwise direction by the rams 18.

FIG. 3F shows the cutting heads 16A and 16B after they have been traversed to their innermost positions by their rams 17A, 17B.

Finally, FIG. 3G shows the cutting heads 16A and 16B after the torque tube 11 has been returned through 180° by retraction of the rams 18, to return the cutting heads to the same relative positions as shown in FIG. 3A.

The machine is then ready to take a further cut which is possible without advancing the machine proper providing that the ram 20 is of sufficient stroke. Otherwise the canopy-supporting rams 24 and 26 are exhausted and the advancing mechanism of the platform 6 is operated.

The sequence described with respect to FIGS. 3A to 3G is suitable for tunnels in the range of 14 foot to 16 foot diameter with cutting heads having a diameter of substantially 4 foot.

For a diameter tunnel for example less than 12 foot in diameter, with the machine still employing 4 foot diameter cutting heads, the procedures shown by FIGS. 3B and 3C are omitted and an uncut area *x* (FIG. 3F), which remains when the cutting heads proceed directly from the FIG. 3A position to the FIG. 3D position, is removed when the heads move from the FIG. 3F position to the FIG. 3G position.

We claim:

1. A tunneling machine for cutting cylindrical tunnels comprising:
    a. a support platform and means associated therewith for propelling said support platform forwardly and rearwardly;
    b. a frame mounted on said platform and movable relative thereto about substantially horizontal and vertical axes;
    c. a torque shaft mounted in and extending forwardly of said frame;
    d. a piston and cylinder unit operable to rotate said torque shaft through 180°;
    e. a piston and cylinder unit operable to axially advance and retract said torque shaft relative to said frame;
    f. an arm mounted on the forward end of said torque shaft and having two arm sections extending radially from said torque shaft at a 180° respective angle;
    g. a slideway provided on each side arm section;
    h. a carriage slidably mounted in each said slideway;
    i. a motor-driven rotary pick-mounting cutting head supported in each said carriage; and
    j. drive means for traversing said carriages along said slideways at equal distances from the axis of said torque shaft thereby ensuring that said cutting heads remain counterbalanced.

2. A method for cutting a cylindrical tunnel in a mineral face utilizing a tunneling machine having two rotary cutting heads on parallel axes, said method comprising the following steps:
    a. axially advancing the cutting heads into the mineral face to remove material therefrom;
    b. revolving the cutting heads 180° about an axis parallel to and in the plane of the cutting head axes and equidistant therebetween, said revolving action removing additional material from the mineral face;
    c. radially traversing the cutting heads perpendicular to the revolution axis, the cutting heads remaining equidistant from the revolution axis, said traversing action removing additional material from the mineral face; and
    d. revolving the cutter heads 180° about the revolution axis, said revolving action removing additional material from the mineral face.

3. The method of claim 2 wherein after each mineral-removing revolving step, the cutting heads are counter revolved 180° without removing material from the mineral face.

* * * * *

PO-1050
(5/69)

UNITED STATES PATENT OFFICE
CERTIFICATE OF CORRECTION

Patent No. 3,639,004                     Dated  February 1, 1972

Inventor(s)  Peter Lockwood & Gerald R. O. Pentith

It is certified that error appears in the above-identified patent and that said Letters Patent are hereby corrected as shown below:

In line 7 of the Abstract: The words "the heads traversed to new" have been omitted from the printing of the patent between the words "position," and "equally".
Line 7 of the Abstract should read "returned to its original position, the heads traversed to new equally spaced radial posi-"

In line 16 of Col. 1 of the Specification: The words "are sumped into the" have been omitted from the printing of the patent between the words "heads" and "mineral"
Line 16 of Col. 1 should read "two rotary cutting heads are sumped into the mineral face"

Signed and sealed this 20th day of June 1972.

(SEAL)
Attest:

EDWARD M. FLETCHER, JR.           ROBERT GOTTSCHALK
Attesting Officer                 Commissioner of Patents